US009529464B2

(12) United States Patent
Sitbon

(10) Patent No.: US 9,529,464 B2
(45) Date of Patent: Dec. 27, 2016

(54) DUAL DISPLAY ASSEMBLY

(71) Applicant: U-SEE 2 LIMITED, Limassol, P.C. (CY)

(72) Inventor: David Eduard Sitbon, Beer Sheva (IL)

(73) Assignee: U-SEE 2 LIMITED, Limassol, P.C. (CY)

( * ) Notice: Subject to any disclaimer, the term of this patent is extended or adjusted under 35 U.S.C. 154(b) by 0 days.

(21) Appl. No.: 14/761,657

(22) PCT Filed: Jan. 19, 2014

(86) PCT No.: PCT/IL2014/050062
§ 371 (c)(1),
(2) Date: Jul. 17, 2015

(87) PCT Pub. No.: WO2014/111941
PCT Pub. Date: Jul. 24, 2014

(65) Prior Publication Data
US 2015/0363017 A1  Dec. 17, 2015

(30) Foreign Application Priority Data
Jan. 21, 2013 (IL) .......................................... 224353

(51) Int. Cl.
*G06F 1/16* (2006.01)
*G06F 3/041* (2006.01)
(Continued)

(52) U.S. Cl.
CPC .............. *G06F 3/041* (2013.01); *F16M 11/08* (2013.01); *G06F 1/1601* (2013.01);
(Continued)

(58) Field of Classification Search
CPC combination set(s) only.
See application file for complete search history.

(56) References Cited

U.S. PATENT DOCUMENTS 5,687,939 A    11/1997  Moscovitch
5,746,334 A *   5/1998  Brandenberg ........... A47B 9/14
                                                211/205
(Continued)

FOREIGN PATENT DOCUMENTS

DE    198 00 376     7/1999
WO    WO 99/31649    6/1999
(Continued)

OTHER PUBLICATIONS

International Search Report issued in corresponding PCT International Application No. PCT/IL2014/050062 and the Written Opinion.

*Primary Examiner* — Lisa Lea Edmonds
(74) *Attorney, Agent, or Firm* — Frommer Lawrence & Haug LLP; William S. Frommer

(57) ABSTRACT

A dual display assembly, which comprises a base in contact with an underlying surface; a rod unit vertically extending from the base; and two separate touch screens laterally extending from, and attached to, the rod unit. Each of the two touch screens is pivotally displaceable independently with respect to the other screen and is able to be sufficiently locked in position after being displaced to a desired angular position to facilitate touch operations therewith. The the rod unit comprises first and second concentric rods that are rotatable about a vertical axis, and a one-way mechanism that is provided within an annular space between the first and second rods for retaining a touch screen in a locked position.

20 Claims, 6 Drawing Sheets

(51) Int. Cl.
  *F16M 11/08* (2006.01)
  *G06F 1/18* (2006.01)
(52) U.S. Cl.
  CPC .............. *G06F 1/1649* (2013.01); *G06F 1/18* (2013.01); *F16M 2200/065* (2013.01); *F16M 2200/08* (2013.01)

(56) References Cited

U.S. PATENT DOCUMENTS

| | | | |
|---|---|---|---|
| 5,796,577 A | 8/1998 | Ouchi et al. | |
| 6,094,341 A | 7/2000 | Lin | |
| 6,212,068 B1 * | 4/2001 | Rooyakkers | A47B 21/00 312/208.1 |
| 6,343,006 B1 * | 1/2002 | Moscovitch | B60R 11/02 348/794 |
| 6,670,950 B1 | 12/2003 | Chin et al. | |
| 7,623,342 B2 * | 11/2009 | Ozolins | F16M 11/04 16/361 |
| RE42,091 E * | 2/2011 | Moscovitch | B60R 11/02 348/794 |
| 8,083,189 B2 * | 12/2011 | Sun | F16M 11/08 248/122.1 |
| RE43,921 E * | 1/2013 | Smed | F16M 11/04 248/124.1 |
| 8,462,103 B1 * | 6/2013 | Moscovitch | B60R 11/02 345/1.1 |
| 2001/0054986 A1 | 12/2001 | Leman | |
| 2002/0109662 A1 | 8/2002 | Miller | |
| 2003/0089830 A1 | 5/2003 | Loughman | |
| 2004/0051679 A1 | 3/2004 | Ponx | |
| 2005/0258319 A1 * | 11/2005 | Jeong | F16M 11/105 248/176.1 |
| 2008/0232044 A1 * | 9/2008 | Moscovitch | F16M 11/02 361/679.04 |
| 2009/0167634 A1 * | 7/2009 | Han | G06F 1/1601 345/1.3 |
| 2012/0091076 A1 * | 4/2012 | Huang | F16M 11/08 211/26 |
| 2013/0092805 A1 * | 4/2013 | Funk | F16M 13/02 248/121 |

FOREIGN PATENT DOCUMENTS

| | | |
|---|---|---|
| WO | WO 02/27447 | 4/2002 |
| WO | WO 2005/067479 | 7/2005 |

* cited by examiner

DUAL DISPLAY ASSEMBLY

FIELD OF THE INVENTION

The present invention relates to the field of computer monitors. More particularly, the invention relates to apparatus for allowing pivotal displacement of a screen of a dual display assembly.

BACKGROUND OF THE INVENTION

A dual display assembly for computers allows each participant of a front-to-front meeting to view a corresponding screen, to more efficiently utilize the time of the participants. The ability to pivot a screen prevents any interference caused by the screen during the meeting.

Many portable computers having two pivotally displaceable display screens are known from the prior art, including DE, 198 00 376, U.S. Pat. No. 5,796,577, U.S. Pat. No. 6,094,341, U.S. Pat. No. 6,670,950, US 2001/0054986, US2002/0109662, US 2004/0051679, WO 99/31649 and. WO 2005/067479. However, the displacement of one screen causes a change in position of the second screen.

It is an object of the present invention to provide a dual screen assembly in which one screen is pivotally displaceable independently with respect to another screen.

It is an additional object of the present invention to provide a dual screen assembly that is stable when a screen is pivoted.

Other objects and advantages of the invention will become apparent as the description proceeds.

SUMMARY OF THE INVENTION

The present invention provides a dual display assembly, comprising a base in contact with an underlying surface, a rod unit vertically extending from said base, and two separate touch screens laterally extending from, and attached to, said rod unit, wherein each of said two touch screens is pivotally displaceable independently with respect to the other screen and is able to be sufficiently locked in position after being displaced to a desired angular position to facilitate touch operations therewith.

In one aspect, the rod unit comprises first and second concentric rods that are rotatable about a vertical axis, and a one-way mechanism that is provided within an annular space between said first and second rods for retaining a touch screen in a locked position.

In one aspect, the first rod is hollow and received in a stationary and vertically extending annular tube and the second rod passes through, and is longer than, the first rod and is also inserted within a socket formed within the base that is concentric with said tube.

In one aspect, a one-way mechanism is also provided within an annular space between the first rod and the tube.

In one aspect, a first screen is mounted on two vertically spaced brackets laterally extending from the first rod, allowing a force applied on the first screen to be transmitted to the first rod.

In one aspect, a second screen is mounted on two laterally spaced brackets that are connected to a cantilevered member laterally extending from an upper terminal portion of the second rod, allowing a force applied on the second screen to be transmitted to the second rod.

In one aspect, the cantilevered member comprises a cable guide laterally extending from the terminal portion and a laterally extending extension rotatably attached to a reduced diameter portion of said cable guide by means of a one-way mechanism, allowing the second screen to be rotated about a horizontal axis.

In one aspect, a camera is rotatably attached to the terminal portion and is operable to capture images of a viewer of the first screen or a viewer of the second screen, depending on an angular position of said camera.

In one aspect, the base is sufficiently weighted to retain its stability when at least one of the screens is pivotally displaced.

In one aspect, stabilizer elements proximate to the rod unit extend forwardly and rearwardly, respectively, from the base.

In one aspect, the second rod is also hollow and screen related cables extend within an interior of the rod unit from a printed circuit board housed within the base.

In one aspect, screen related cables extending from a printed circuit board housed within the base are wrapped around an outer surface of the first and second rods.

In one aspect, the dual display assembly further comprises a plurality of rod covers positioned one on top of the other that enclose the first and second rods while permitting rotational movement.

DETAILED DESCRIPTION OF PREFERRED EMBODIMENTS

Figure 1:
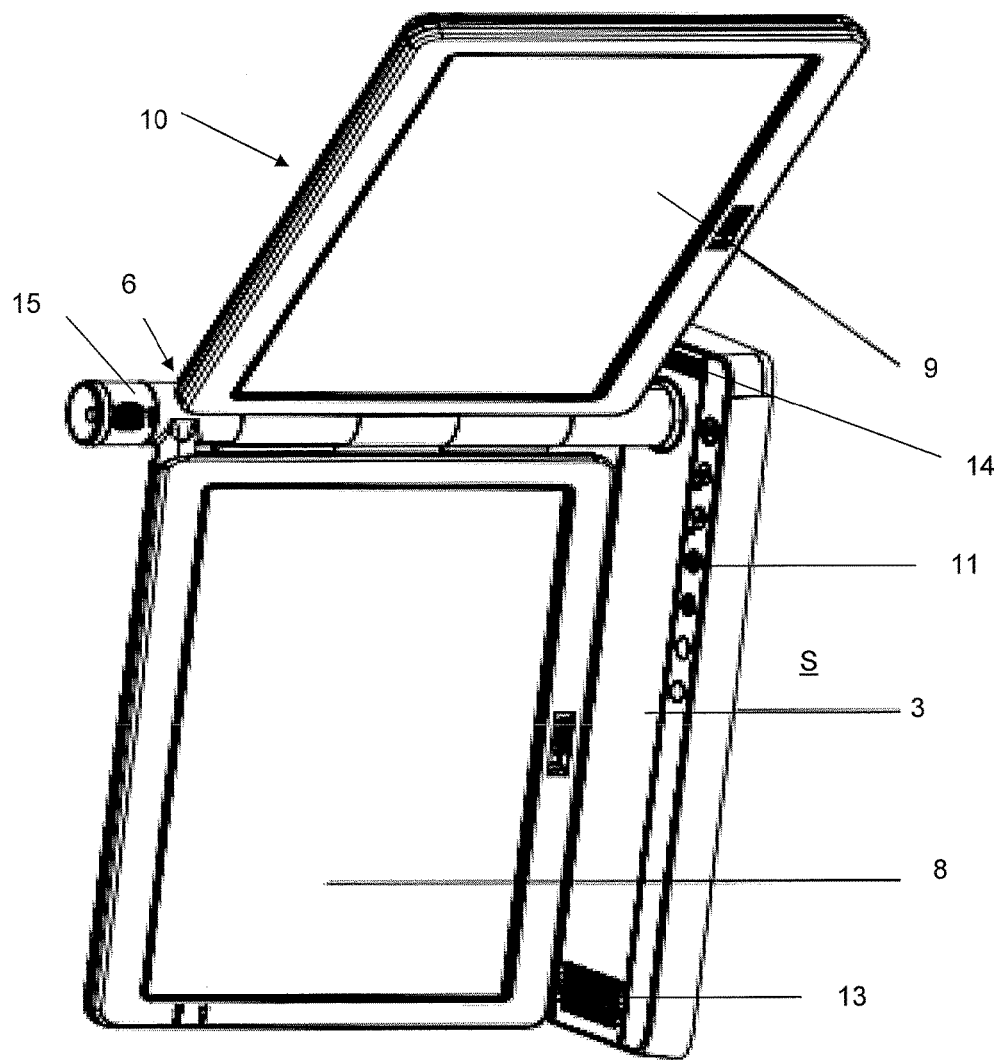
FIG. 1 is a perspective view of a dual display assembly, according to one embodiment of the present invention.

FIG. 1 illustrates an assembled dual display assembly, according to one embodiment of the present invention. Dual display assembly 10 comprises base 3 in contact with an underlying surface S, a pivot inducing rod unit 6 vertically extending from base 3, and two separate touch screens 8 and 9 laterally extending from rod unit 6. Each of touch screens 8 and 9 is pivotally displaceable independently with respect to the other screen. After a user selects a desired angular screen position, the touch screen is locked in position and will not be angularly displaced when a substantially horizontal force is applied thereto, thereby enabling reliable touch operations.

Base 3 is weighted so as to be sufficiently sturdy to support the weight of touch screens 8 and 9 without toppling, even when a touch screen is being pivoted and the center of gravity of dual display assembly 10 is changed. Base 3 is provided with a plurality of control buttons 11 for controlling screen related features, such as screen brightness and volume of an audio signal transmitted to assembly 10, a speaker 13 for emitting the transmitted audio information, and a microphone 14.

Dual display assembly 10 is adapted for use by two users, for example in a front-to-front meeting, one viewing screen 8 and the other viewing screen 9. A viewer may simply rotate a screen about rod unit 6 if its current viewing angle is found to be unsatisfactory, By virtue of the dual display, both viewers may be able to view the same images, or alternatively may view different images. A first viewer viewing screen 8, e.g. a salesman or a bank clerk, may control by a master-slave arrangement which images the second viewer sees on screen 9, or whether to prevent the second viewer from seeing any images at all, and control buttons 11 are therefore illustrated as being accessible only to the first viewer. However, it is also in the scope of the invention that both viewers will be able to access the control buttons.

Alternatively, a single user may view both screens 8 and 9. In order to allow both one viewer and two viewer interaction with dual display assembly 10, each of screens 8 and 9 may be two sided such that a first face of a screen is visible to the first viewer and its second face is visible to the second viewer.

A digital camera 15 may be mounted on top of rod unit 6. Digital camera 15 may have a cylindrical configuration, with the same diameter as rod unit 6. During a video conference during which the first and second viewers are participating, for example, digital camera 15 may capture images and voice information of the first viewer, transmit the captured information to another participant of the video conference, and then be rotated so as to be pointing at the second viewer in order to capture additional participant information.

Figure 2:
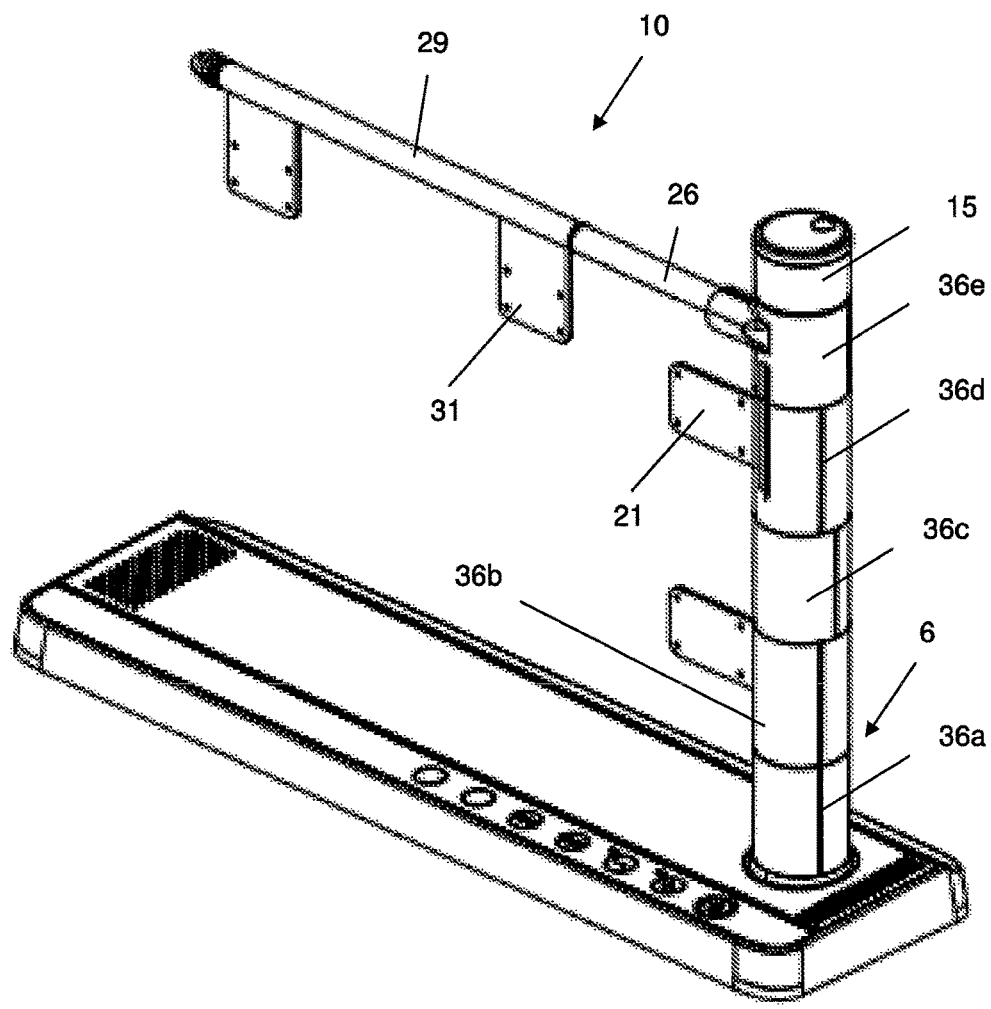
FIG. 2 is a perspective view of the assembly of FIG. 1, shown while the screens are detached therefrom.
Figure 3:
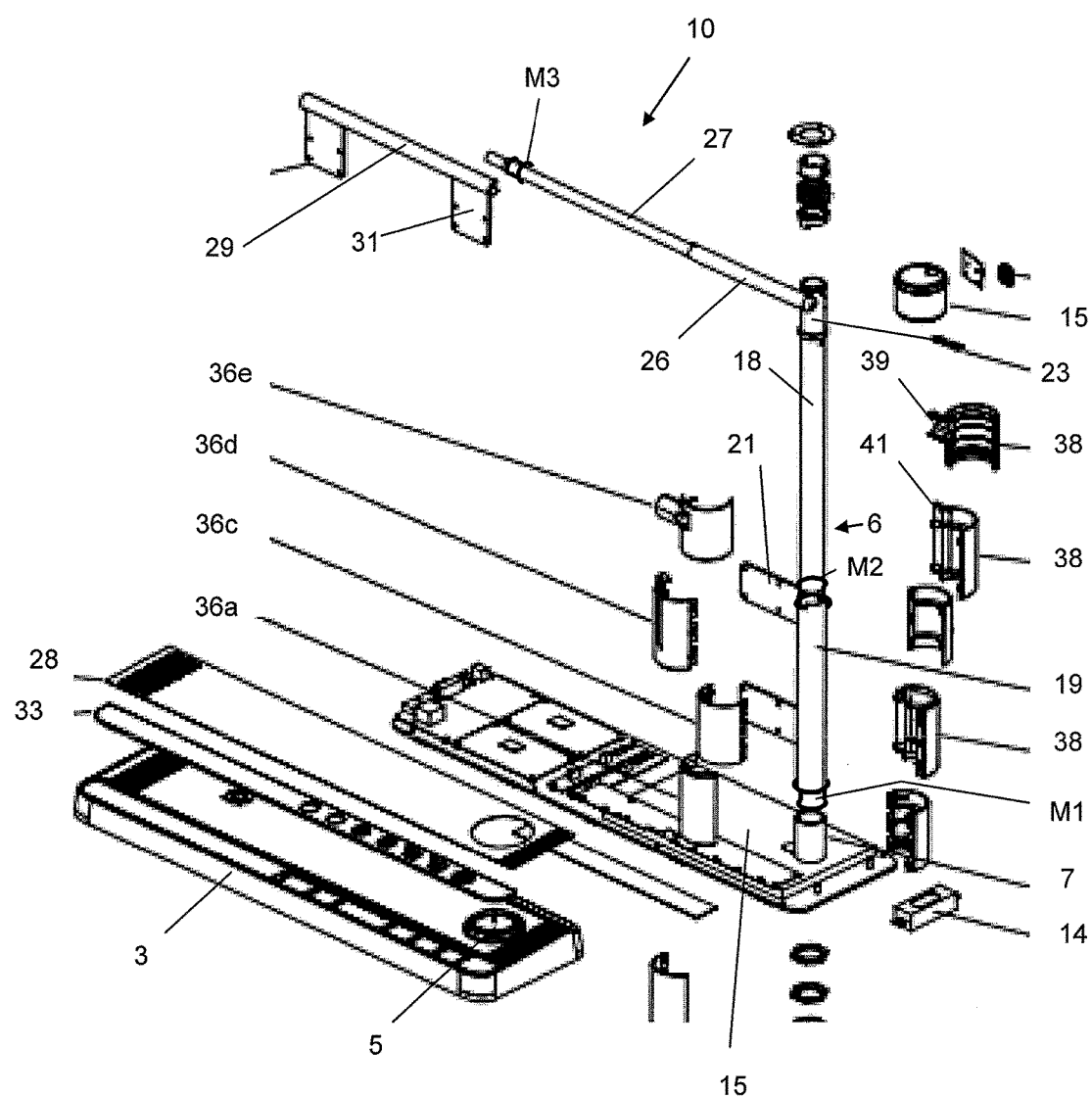
FIG. 3 is an exploded, perspective view of the assembly of FIG. 1, shown while the screens are detached therefrom.

FIGS. 2 and 3 illustrate the structure of dual display assembly 10 while the screens are detached therefrom. Rod unit 6 comprises two concentric hollow rods 18 and 19 rotatable about a vertical axis, through which cables connected to the two screens, respectively, are fed. Rod 18 for connection to screen 8 is inserted within, and longer than, rod 19 adapted for connection to screen 9 and within socket 5 formed within base 3. Rod 19 in turn is insertable within stationary annular tube 7 vertically extending from printed circuit board 15, which is attached to base 3. Printed circuit board 15 is covered by main panel 29 and control button panel 33. Schematically illustrated one-way mechanism M1 for retaining rod 19 in a locked position after angularly displacing screen 9 in a desired fashion is provided within the annular space between tube 7 and rod 19. A similar one-way mechanism M2 is provided within the annular space between rods 18 and 19.

Screen 9 is mounted on two vertically spaced brackets 21 laterally extending from rod 19, allowing a force applied on the screen to be transmitted to rod 19.

A cantilevered cable guide 26, e.g. which is tubular, laterally extends from an upper terminal portion 23 of vertical rod 18. A laterally extending extension 29 is rotatably attached to a reduced diameter portion 27 of cable guide 26 by means of schematically illustrated one-way mechanism M3. Two laterally spaced brackets 31 to which screen 8 is attached downwardly extend from extension 29, allowing screen 8 to be rotated about a horizontal axis, for added viewer comfort. Camera 15 is rotatably attached to terminal portion 23, so as to allow directing it to any user that views one of the displays during a chat or a video call (e.g., using software that allows users to communicate by voice using a microphone, video by using a webcam, and instant messaging over the Internet, such as Skype or Viber). Also, a microphone may be attached to Camera 15, so as to allow directing it to any user that views one of the displays and wishes to communicate with another remote user.

A plurality of esthetic rod covers 36a-e, e.g. made of plastic, positioned one on top of the other embrace rods 18 and 19 while permitting rotational movement. Each rod cover consists of two diametrically opposite, interconnected half portions. Upper rod cover 36e has a tubular main portion 38 for embracing rod 18 and a tubular extension 39 for embracing cable guide 26. Rod covers 36b and 36d have a tubular main portion 38 and a short and straight extension 41 for contacting a corresponding bracket 21. Rod covers 36a and 36c have only a tubular main portion 38. The top edge of rod cover 36b coincides with the top edge of rod 19.

Figure 4:
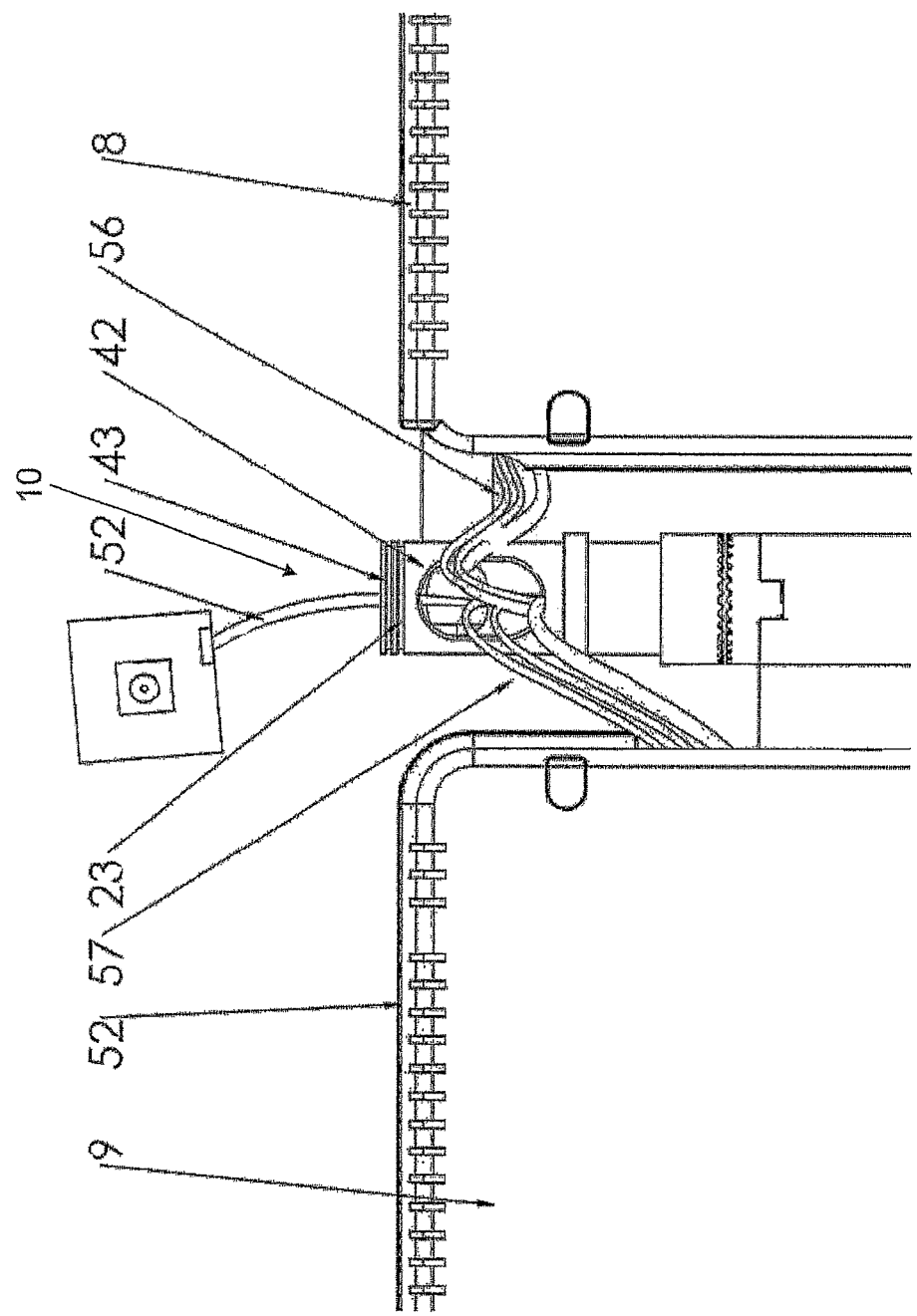
FIG. 4 is an enlarged rear view of the dual display assembly of FIG. 1, shown without rod covers.

FIG. 4 illustrates an enlarged rear view of dual display assembly 10 without the rod covers. Terminal portion 23 has an opening 42 from which exit screen related flexible cables that extend from the printed circuit board through the interior of the rod unit and a top opening 43 from which exits a camera related flexible cable 52 from the printed circuit board. A first group of cables 56 extend along the bottom of cable guide 26 to screen 8 and a second group of cables 57 extend to screen 9.

Figure 5:
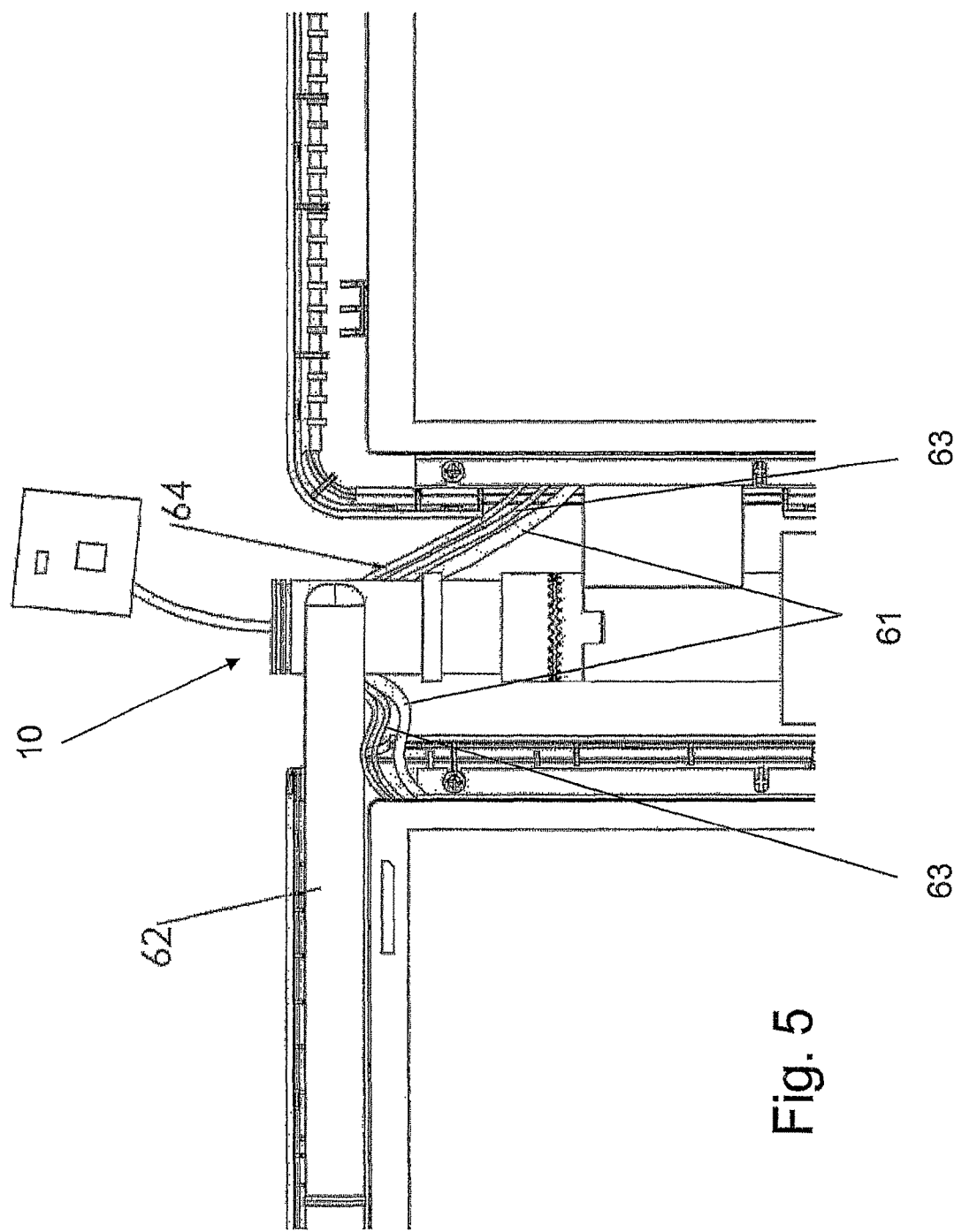
FIG. 5 is an enlarged front view of the dual display assembly of FIG. 1, shown without rod covers.

FIG. 5 illustrates an enlarged front view of dual display assembly 10. Various screen related cables are indicated, and include backlight power cable 61, LED cable 62, LVDS cable 63, and touch panel screen 64.

In another embodiment, the screen related and camera related cables extend from the printed circuit board and are wrapped about the outer surface of the rotatable rods. The cables are of a sufficiently long length in order to accommodate screen pivoting operations, which influence tension of the cables. The rod covers enclose the rods by a sufficient clearance to permit movement of the cables during a screen pivoting operation.

Figure 6:
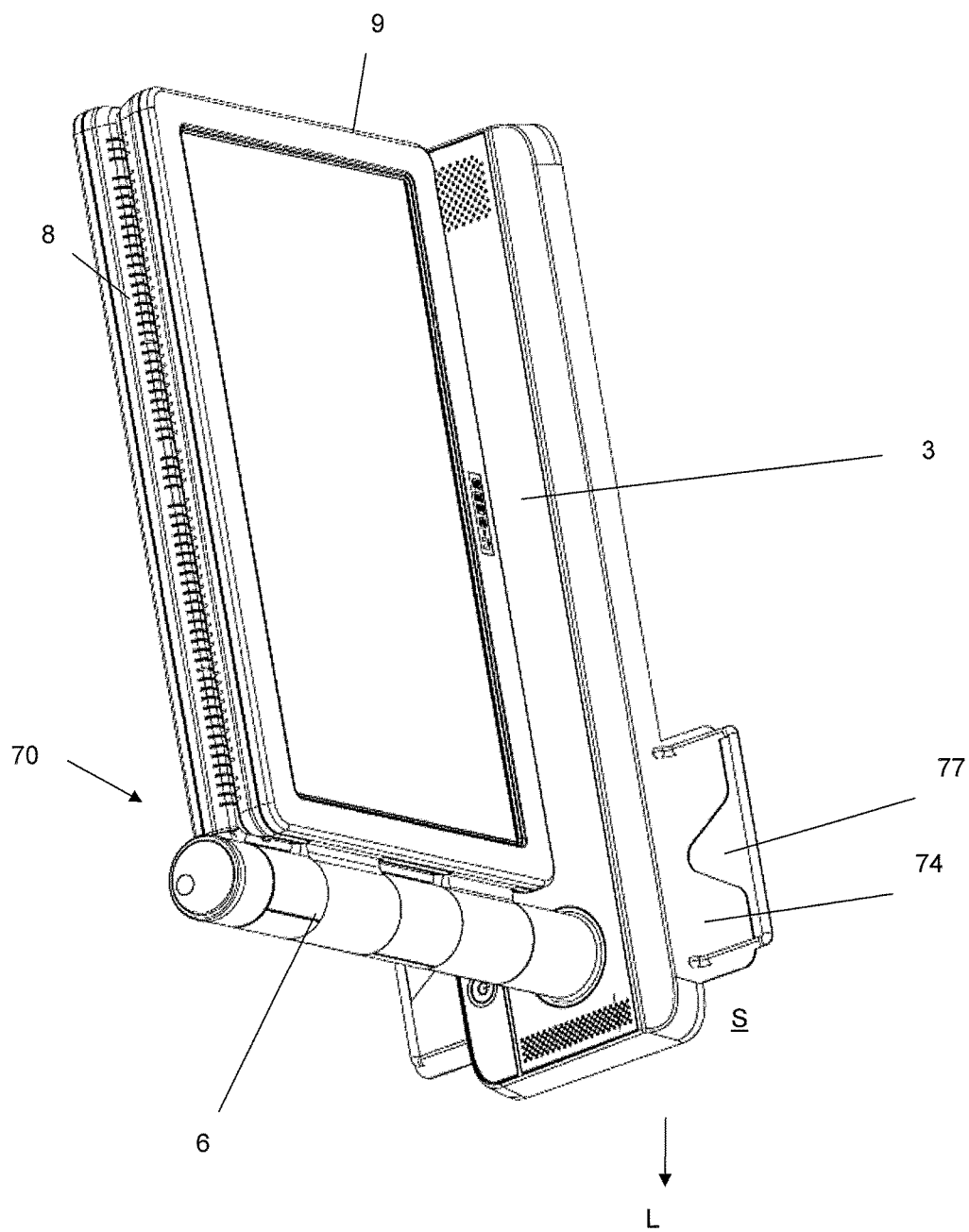
FIG. 6 is a perspective view of a dual display assembly, according to another embodiment of the invention.

FIG. 6 illustrates another embodiment of the invention wherein base 3 of dual display assembly 70 is provided with forwardly and rearwardly extending stabilizer elements 74 in the vicinity of rod unit 6. Stabilizer elements 74 may be made of a single rectangular sheet of thin plastic material formed with a sinusoidal cutout 77 to define two legs. Stability of base 3 may be improved by virtue of the increased support surface engagement provided by stabilizer elements 74 during a screen pivoting operation. For example, when screens 8 and 9 become separated by 40 degrees, base 3 tends to tip in a lateral direction L away from rod unit 6 due to the change in center of gravity. However, base 3 remains in its original disposition due to the contact between stabilizer elements 74 and the underlying surface S, without disrupting any viewing or interfacing operations with the screens.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:
1. A dual display assembly, comprising:
a) a base in contact with an underlying surface;
b) a rod unit vertically extending from said base, wherein said rod unit comprises first and second concentric rods that are rotatable about a vertical axis;
c) two separate touch screens laterally extending from, and attached to, said first and second rods, respectively; and
d) a one-way mechanism that is provided within an annular space between said first and second rods for retaining a touch screen in a locked position, wherein each of said two touch screens is pivotally displaceable independently with respect to the other screen and is able to be sufficiently locked in position after being displaced to a desired angular position to facilitate touch operations therewith.

2. The dual display assembly according to claim 1, wherein the first rod is hollow and received in a stationary and vertically extending annular tube and the second rod passes through, and is longer than, the first rod and is also inserted within a socket formed within the base that is concentric with said tube.

3. The dual display assembly according to claim 2, wherein the one-way mechanism is also provided within an annular space between the first rod and the tube.

4. The dual display assembly according to claim 3, wherein a first screen is mounted on two vertically spaced brackets laterally extending from the first rod, allowing a force applied on the first screen to be transmitted to the first rod.

5. The dual display assembly according to claim 2, wherein a second screen is mounted on two laterally spaced brackets that are connected to a cantilevered member laterally extending from an upper terminal portion of the second rod, allowing a force applied on the second screen to be transmitted to the second rod.

6. The dual display assembly according to claim 5, wherein the cantilevered member comprises a cable guide laterally extending from the terminal portion and a laterally extending extension rotatably attached to a reduced diameter portion of said cable guide by means of an additional one-way mechanism, allowing the second screen to be rotated about a horizontal axis.

7. The dual display assembly according to claim 5, wherein a camera is rotatably attached to the terminal portion and is operable to capture images of a viewer of the first screen or a viewer of the second screen, depending on an angular position of said camera.

8. The dual display assembly according to claim 2, wherein the second rod is also hollow and screen related cables extend within an interior of the rod unit from a printed circuit board housed within the base.

9. The dual display assembly according to claim 8, further comprising a plurality of rod covers positioned one on top of the other that enclose the first and second rods while permitting rotational movement.

10. The dual display assembly according to claim 1, wherein the base is sufficiently weighted to retain its stability when at least one of the screens is pivotally displaced.

11. The dual display assembly according to claim 10, wherein stabilizer elements proximate to the rod unit extend forwardly and rearwardly, respectively, from the base.

12. The dual display assembly according to claim 1, wherein screen related cables extending from a printed circuit board housed within the base are wrapped around an outer surface of the first and second rods.

13. The dual display assembly according to claim 12, further comprising a plurality of rod covers positioned one on top of the other that enclose the first and second rods while permitting rotational movement.

14. A dual display assembly, comprising:
a) a base in contact with an underlying surface;
b) a printed circuit board housed within said base;
c) a rod unit vertically extending from said base, said rod unit comprising first and second concentric rods that are rotatable about a vertical axis;
d) two separate touch screens laterally extending from, and attached to, said first and second rods, respectively, wherein screen related cables extending from said printed circuit board are wrapped around an outer surface of said first and second rods, and first and second groups of said cables extend to said two touch screens, respectively; and
e) a plurality of rod covers positioned one on top of the other that enclose said first and second rods while permitting rotational movement,
wherein each of said two touch screens is pivotally displaceable independently with respect to the other screen and is able to be sufficiently locked in position after being displaced to a desired angular position to facilitate touch operations therewith.

15. The dual display assembly according to claim 14, wherein the rod unit comprises a mechanism that is provided within an annular space between said first and second rods for retaining a pivotally displaceable touch screen in a locked position.

16. The dual display assembly according to claim 15, wherein the first rod is hollow and received in a stationary and vertically extending annular tube and the second rod passes through, and is longer than, the first rod and is also inserted within a socket formed within the base that is concentric with said tube, and wherein the second rod is also hollow and cables extend within an interior of the rod unit from the printed circuit board housed within the base.

17. The dual display assembly according to claim 16, wherein the mechanism for retaining a pivotally displaceable touch screen in a locked position is also provided within an annular space between the first rod and the tube.

18. The dual display assembly according to claim 17, wherein a first touch screen is mounted on two vertically spaced brackets laterally extending from the first rod, allowing a force applied on the first screen to be transmitted to the first rod, and a second touch screen is mounted on two laterally spaced brackets that are connected to a cantilevered member laterally extending from an upper terminal portion of the second rod, allowing a force applied on the second screen to be transmitted to the second rod.

19. The dual display assembly according to claim 18, wherein the cantilevered member comprises a cable guide laterally extending from the terminal portion and a laterally extending extension rotatably attached to a reduced diameter portion of said cable guide by means of an additional mechanism, allowing the second screen to be rotated about a horizontal axis.

20. The dual display assembly according to claim 18, wherein a camera is rotatably attached to the terminal portion and is operable to capture images of a viewer of the first screen or a viewer of the second screen, depending on an angular position of said camera.

* * * * *